United States Patent [19] [11] 4,116,937
Jones et al. [45] Sep. 26, 1978

[54] COMPLIANT MALEIMIDE BASED PLASTICS

[75] Inventors: Robert J. Jones, Hermosa Beach; Michael K. O'Rell, Manhattan Beach; James D. Sutherland, Los Angeles, all of Calif.

[73] Assignee: TRW Inc., Redondo Beach, Calif.

[21] Appl. No.: 717,785

[22] Filed: Aug. 25, 1976

[51] Int. Cl.$^2$ .................. C08G 69/44; C08G 73/12
[52] U.S. Cl. ............................ 528/170; 260/857 UN; 427/221; 428/474; 528/229; 528/322
[58] Field of Search ............ 260/47 CP, 47 UA, 49, 260/78 UA, 47 UP; 526/11.1

[56] References Cited

U.S. PATENT DOCUMENTS

| 2,818,405 | 12/1957 | Kovacic | 260/78 UA |
|---|---|---|---|
| 3,652,511 | 3/1972 | Vincent et al. | 260/78 UA |
| 3,812,082 | 5/1974 | Jones | 260/30.6 R |
| 3,840,495 | 10/1974 | Balme et al. | 260/78 UA |
| 3,868,351 | 2/1975 | Hand et al. | 260/78 UA |
| 3,951,902 | 4/1976 | Jones et al. | 260/78 UA |
| 3,970,714 | 7/1976 | Bargain | 260/78 UA |
| 3,998,904 | 12/1976 | Balme et al. | 260/78 UA |

OTHER PUBLICATIONS

Nakajima, "Advances in Chem. Series", 125 PTCS Myer Erzin Editor 1973.

Primary Examiner—Herbert J. Lilling
Attorney, Agent, or Firm—John J. Connors; Donald R. Nyhagen; Robert W. Keller

[57] ABSTRACT

Polyaminobismaleimides having superior thermomechanical properties can be produced by reacting maleimide terminated polyaliphatic ethers and maleimide terminated aromatic compounds with an aromatic diamine. These bismaleimide polymers display high recoverable elongation together with good tensile adhesive and electrical properties and thermal and fuel stability.

7 Claims, No Drawings

COMPLIANT MALEIMIDE BASED PLASTICS

BACKGROUND OF THE INVENTION

Polyimides in the prior art generally have been produced from highly aromatic monomers. These polyimides have exhibited good thermo-oxidative stability in temperature ranges up to 300° to 400° C. Thus, in applications where elevated temperatures and corrosive conditions exit, polyimides have been extensively employed. However, because polyimides exhibit low percentages of elongation to break, and because they exhibit essentially no recoverable elongation of elasticity, they have not been used for many applications such as seals, sealants, or certain coating applications which required an elastomeric or compliant material.

U.S. Pat. No. 3,812,082 teaches a compliant or highly flexible polyimide produced from a condensation reaction of a dianhydride and a diamine or diisocyanate. These polyimides exhibit an elongation to break of up to 300 percent, and a set at break of 25 percent or less. Thus, where a high performance sealing material is required and it can be cast, these polyimides are very suitable.

A significant advance in a practical route to flexible polyimides is taught in U.S. Pat. No. 3,951,902. In this addition-type poly(Diels-Alder) approach, a melt polymerization reaction yields polymers acceptable for use at temperatures up to 550° F. The polyimides processed by this melt process possess properties equivalent to the solution route employed in U.S. Pat. No. 3,812,082. Thus, a melt process is available to prepare flexible polyimdies which possess a high elongation to break and can be melt extruded or cast into a variety of products including seals, sealants, adhesives and coatings. This availability of melt polymerization and melt product fabrication processes means substantial cost reduction and significant lessening of human hazards and environmental pollution over polyimides produced and processed by conventional solution methods.

U.S. Pat. No. 3,652,511 teaches a water-dispersible polyimide coating formed by reacting maleic anhydride with an aliphatic diamine in solution. The polyimide product can be formed into a hard and solvent resistant film. Elastomeric or high recoverable elongation characteristics are not inherent to the solution-produced polyimide itself and are achieved only by a copolymer reaction such as reacting a sulfhydryl-terminated polymer, such as nitrile rubber, with the maleic unsaturation in the bismaleimide or the acidic ether side chain. This approach significantly limits or excludes their utility in terms of applications where use in seal, sealant adhesive and coating use is required at temperatures of 250° F. or greater. Also, these resins have pendant carboxyl groups to achieve water solubility which tends to diminish their utility for general engineering applications due to possible unfavorable side reactions in high temperature use environments.

Similarly, U.S. Pat. No. 2,818,405 teaches elastomeric polyimides formed by the equal molar reaction of bismaleimides and free organic diamines. The organic diamines employed in this invention are hydrocarbon or halogenated hydrocarbon segments which restrict temperature performance to 200° F. or below. Also, the technology disclosed in this patent necessitates the use of organic tri- or tetraamines to accomplish cure of the linear imide resin produced initially. Use of the technology described therein severely limits achievement of a broad range of polymer mechanical properties because of the requirement to use 1:1 molecular reactant stoichiometry.

SUMMARY OF THE INVENTION

The present invention teaches a flexible polyimide precursor produced by the Michael addition reaction of an aromatic diamine with an aromatic maleimide and a maleimide terminated polyaliphatic ether by a melt process and a cross-linked final product produced by a cure reaction. The addition reaction which forms the maleimide terminated precursor occurs in the melt at temperatures ranging from 100° to 150° C. Subsequently, when the temperature is raised to between 160° C. and 200° C., the precursor cures by a crosslinking reaction requiring no additional additives or catalysts.

This invention incorporates a direct substitution of an aromatic diamine chain extender for the aromatic bis(-furfuryl) imides taught in U.S. Pat. No. 3,951,902. The polymer compositions, linear and cured, claimed herein are substantially identical in mechanical properties and use applications to those derived by the Diels-Alder reaction except they are limited to lower continuous use temperatures.

These polyimides exhibit good thermo-oxidative stability at temperatures up to 160° C. and a recoverable elongation of over 130 percent. In addition to good physical and chemical properties, the polyimides of this invention prepared in the melt also lend themselves to melt-extrusion fabrication procedures, for example, as wire coatings, sealants and adhesives. Coatings of filled or unfilled polyimide resin can be melt-extruded onto a wire, to form a precursor coating which is cured subsequently to a tough, flexible and peelable coating.

Similar compositions to those claimed herein can be prepared by the simple condensation reaction of bis(-succinic) anhydrides with aliphatic ether diamines and-/or aromatic diamines according to the art taught in U.S. Pat. No. 3,812,082. When this approach is used, a product of approximately equivalent thermo-mechanical properties to that discussed in the paragraphs above is produced. However, this process must be prepared in solution, as distinguished from the present process, which considerably restricts the value or use of such compositions.

DESCRIPTION OF THE PREFERRED EMBODIMENTS

Bismaleimides used in the present invention are selected from aromatic compounds and polyaliphatic ether compounds. The aromatic bismaleimides impart higher temperature stability and tensile strength to the final polymer, while the polyaliphatic ethers impart the elastomeric characteristics to the product. Thus, the polymer properties can be changed or modified to meet various product needs by simple stoichiometric variations. All modifications or variations in compositions claimed herein are prepared by melt polymerization.

Aromatic bismaleimides used in this invention may be selected from compounds having the general structure:

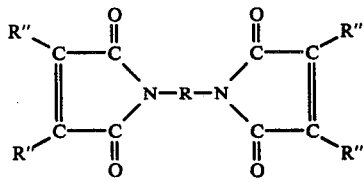

where R" is normally hydrogen, but can also include a $C_1$ to $C_2$ aliphatic group, a benzenoid radical or halogen; and R is a difunctional benzenoid radical having the structure:

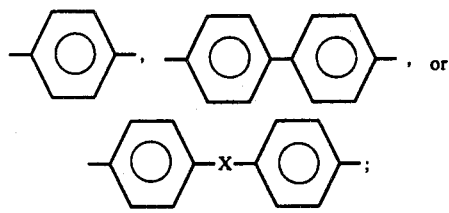

where X is selected from —O—, —S—, —SO$_2$—, —CH$_2$—, —C$_2$H$_4$—, —CO—, —C$_3$H$_6$—, and

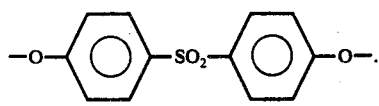

These aromatic bismaleimides are prepared by reacting the corresponding aromatic diamine with two moles of maleic anhydride by procedures well known in the art of imide preparation.

Aliphatic bismaleimides having the general structure:

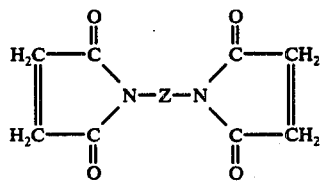

can be selected from a wide variety of polyaliphatic ethers, where Z is a polyaliphatic ether having 1 to 6 carbon atoms. However, a preferred variety of poly(oxyethylene) diamine is produced by the Jefferson Chemical Company and is designed "Jeffamine ED." "Jeffamine ED" is available in 600, 900, and 2000 molecular weights. The "Jeffamine ED" series are represented by the following structure:

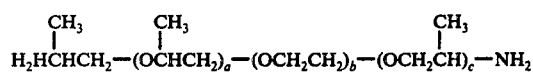

where $a + c$ is 3.5 and $b$ is 13.5 in the 600 molecular weight, 20.5 in the 900 molecular weight, and 45.5 in the 2000 molecular weight. The molecular weight of the polyaliphatic ether may range broadly from 300 to 10,000. The bismaleimide form of the series is produced by reacting the appropriate "Jeffamine" with two moles of maleic anhydride by procedures well known in the art of imide preparation.

The ratio of the amounts of the aliphatic bismaleimide to aromatic bismaleimide will be determined by the properties sought in the polymer product as explained previously. Generally, between 30 percent and 70 percent by weight of the bismaleimide present in the polymer should be comprised of the aliphatic ethers and the balance comprised of the aromatic structures in order to obtain a range of 50 to 300 percent elongation to break of which 80 percent or greater is recoverable at room temperature.

Aromatic diamines are reacted with a stoichiometric amount or an excess of bismaleimide, generally about 10 to 40 percent by weight excess, to produce branched, but tractable, and linear polymer precursors in the melt. Although essentially any aromatic diamine could be used in the polymer, depending upon the end properties sought, the diamines which are preferred are:

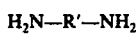

where R' is a difunctional benzenoid radical selected from

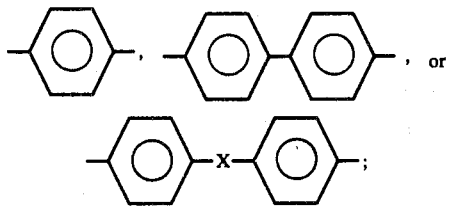

where X is selected from —O—, —S—, —SO$_2$—, —CH$_2$—, —C$_2$H$_4$—, —CO—, —C$_3$H$_6$—, and

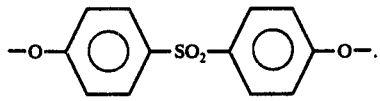

Polymer precursors are prepared by reacting the free aromatic diamines in the melt with a stoichiometric excess of the bismaleimides in a temperature range of from 100° to 150° C. for 15 to 90 minutes. The aromatic diamine reacts during the melt polymerization with the bismaleimides by a Michael addition reaction which is specifically illustrated by the reaction of 4,4'-(maleimidophenyl)methane and a bismaleimide of "Jeffamine" with 4,4'-diaminodiphenyl methane according to the following in which one branch possibility is shown:

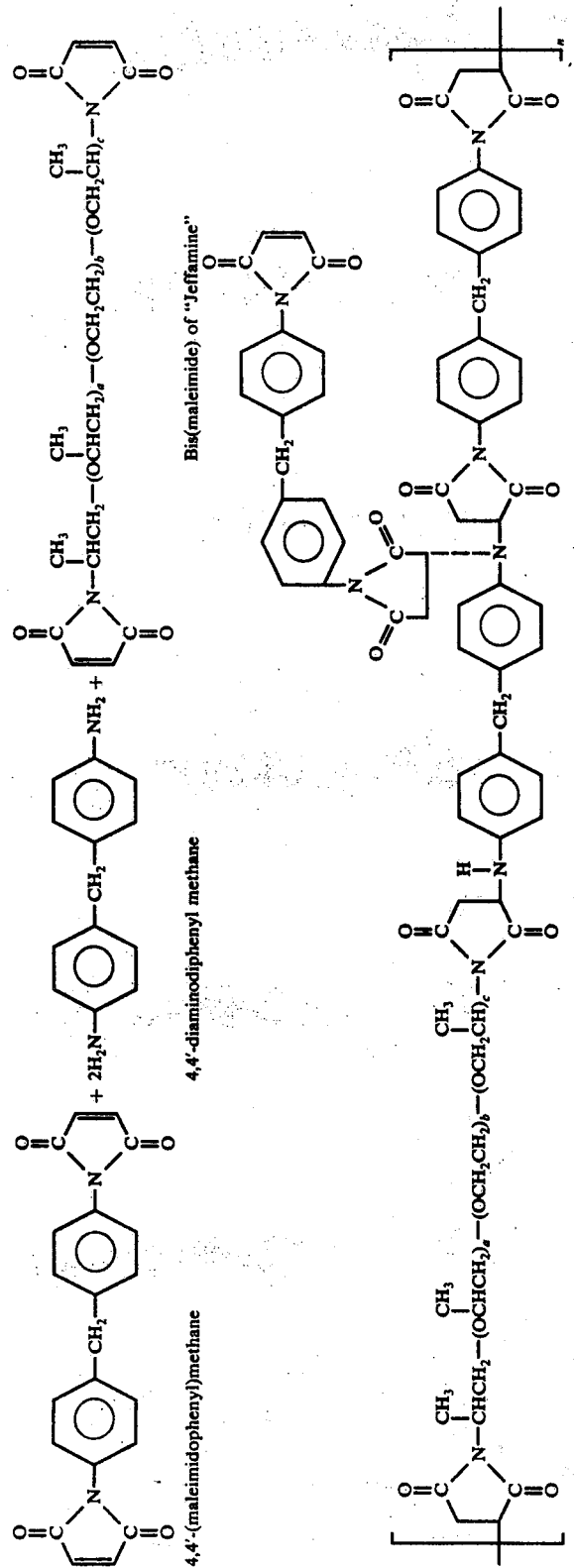

where $n = 2$ to 150, and the --, double dash, indicates that the bismaleimide crosslink is not attached at each nitrogen throughout the precursor, but randomly interspersed with hydrogen radicals. The amount of bismaleimide of "Jeffamine" present in the precursor should be between 30 and 60 percent by weight of the bismaleimide used. The particular amount of the "Jeffamine" used will depend upon the elastomeric properties desired in the final polymer product. Generally, if better elastomeric properties are desired, increased amounts of the polyaliphatic ether should be used. If improved chemical and thermal properties are desired, then the amount of the aromatic bismaleimide is increased. However, if the amount of either the polyaliphatic ether or the aromatic bismaleimide is increased beyond a predetermined maximum, the properties of one with respect to the other begin to deteriorate. Therefore, the polymer can be modified to produce a wide variation in specifications by varying the proportions of the aromatic and polyaliphatic ether bismaleimides.

Cure of the precursor is effected by heating the resin prepolymer in a temperature range of 160° to 200° C. for a period of up to 1 hour. At this temperature range, the precursor crosslinks, presumably through unreacted maleic groups and/or reaction of branching groups by a further intermolecular Michael-addition with free amino hydrogens, to form a tough, elastomeric polymer.

The preferred polymerization route to polymer product is reaction in the neat or solventless condition to give a linear tractable product. However, reactions to produce films of the neat resin for rapid screening of candidate formulations by dissolving polymer in any of several polar organic solvents, for example: tetramethylurea, dimethylsulfone, dimethylformamide, hexamethylphosphoramide, 1-methyl-2-pyrrolidone, or dimethyltetramethylsulfone.

So that the invention may be better understood, the following examples set forth the method for the preparation of the precursors and the final polymer.

EXAMPLE I

PREPARATION OF "JEFFAMINE ED 600" BISMALEIMIDE

To a stirred solution of 25.63 parts of maleic anhydride in 90 parts of dimethyl formamide was added dropwise a solution of 80 parts "Jeffamine ED 600" in 70 parts of dimethyl formamide with cooling under a nitrogen atmosphere. The mixture was stirred for 30 minutes after completion of the "Jeffamine" addition and then 31.6 parts of acetic anhydride and 2.54 parts anhydrous sodium acetate were added to the reaction mixture. The mixture was heated at 50° C. for 3 hours and then the dimethyl formamide solvent was removed in vacuo on roto evaporator. The resultant dark oil was added to 100 ml of benzene and the solution was passed through a column of alumina to remove the sodium acetate and residual acetic anhydride and acetic acid. The benzene was removed at reduced pressure on a roto evaporator to give 98 g of "Jeffamine ED 600" bismaleimide as a dark oil.

PREPARATION OF BIS(4-MALEIMIDOPHENYL)METHANE (BMPM)

To a stirred solution of 98 parts by weight of maleic anhydride in 700 parts of chloroform was added a solution of 99 parts of methylene dianiline in 600 parts of chloroform with cooling so that the temperature was maintained at 15°-20° C. The mixture was stirred for 2 hours, then the bright yellow precipitate of amide acid was collected by filtration, washed well with chloroform and air dried. The dried amide acid was mixed with 300 parts of acetic anhydride and 20 parts of anhydrous sodium acetate. The slurry was heated to 90° C., whereupon a clear yellow solution was obtained. The heat was removed and an exothermic reaction occurred. The stirred mixture was allowed to cool to room temperature and then added to 800 parts of cold ethanol. The precipitated bismaleimide was collected by filtration and washed with ethanol. Recrystallization of the crude product from aqueous dioxane yielded 94 g of nearly colorless bismaleimide, mp 155°-158° C.

EXAMPLE 2

To a stirred melt of 10.0 parts by weight of methylene dianiline at 120° C. was added a mixture of 15.04 parts bis(4-maleimidophenyl)methane and 32.30 parts by weight of 600 molecular weight "Jeffamine" bismaleimide over a 45-minute period under a nitrogen atmosphere. The mixture then was stirred and heated for 15-minutes at 135° C. Upon cooling, a tacky, dark, glassy solid precursor was obtained. Film samples of the material were prepared by casting a dimethyl formamide solution of the precursor (50 percent by weight) on aluminum. The solvent was removed in vacuo at 80° C. and the film was cured at 1 180° C. for 2 hours. The properties of the film are given in the following table.

EXAMPLES 3-8

Preparation of the precursors were carried out in a manner substantially set forth in Example 2 above, however, the "Jeffamine" which was used was 900 molecular weight. Properties of the cured films are set forth in the corresponding examples in the table.

The following table sets forth the mechanical properties of the various formulations of film samples which were obtained after cure.

TABLE

TENSILE PROPERTIES OF FILM SAMPLES

| | Formulation, Parts by Weight | | | | Mechanical Properties | | |
|---|---|---|---|---|---|---|---|
| Example | BMPM[1] | 600 MW[2] Jeffamine BM | 900 MW[3] Jeffamine BM | MDA[4] | Tensile Strength | Percent Elongation at Break | Percent Recoverable Elongation |
| 2 | 15.04 | 32.30 | | 10.0 | 2123 | 105 | 100 |
| 3 | 13.56 | | 26.75 | 10.0 | 2939 | 125 | 96 |
| 4 | 12.92 | | 38.27 | 10.0 | 627 | 148 | 94 |
| 5 | 15.52 | | 30.61 | 10.0 | 1675 | 100 | 97 |
| 6 | 12.02 | | 53.45 | 10.0 | 551 | 70 | 100 |
| 7 | 12.05 | | 35.69 | 10.0 | 1300 | 140 | 89 |

TABLE-continued
TENSILE PROPERTIES OF FILM SAMPLES

| | Formulation, Parts by Weight | | | | Mechanical Properties | | |
| --- | --- | --- | --- | --- | --- | --- | --- |
| Example | BMPM[1] | 600 MW[2] Jeffamine BM | 900 MW[3] Jeffamine BM | MDA[4] | Tensile Strength | Percent Elongation at Break | Percent Recoverable Elongation |
| 8 | 13.56 | | 33.44 | 10.0 | 1654 | 170 | 91 |

[1]BMPM = Bis(4-maleimidophenyl)methane
[2]600 MW Jeffamine BM = 600 MW Jeffamine Bismaleimide
[3]900 MW Jeffamine BM = 900 MW Jeffamine Bismaleimide
[4]MDA = Methylene dianiline One of the specific applications for these compliant polyaminobismaleimides is as an extrusion coating for electrical wires. The following Example 9 sets forth the method by which copper wire is coated. This example employed a silica filler, however, other fillers may comprise talc, carbon black, and calcinated clay at levels of 0.5 to 50 percent by weight depending on ultimate properties desired. Preferably, the hopper end of the screw is maintained at 70°–100° F., and the barrel near the head is maintained at 230°–280° F. The extrusion head temperature is maintained in the range of 260°–310° F. After the precursor has been coated onto the wire substrate, the coated wire is passed through a heated tube maintained at a temperature in the range of 330°–450° F. to cure the coating. The residence time in the cure tube will range from 5 minutes to 2 hours, shorter times being required for the higher temperatures. The optimum conditions depend upon the extrusion rate, filler level, composition, and similar factors.

EXAMPLE 9

A precursor formulation of 10.0 parts methylene dianiline, 12.1 parts by weight of bis(4-maleimidophenyl)methane, and 35.7 parts by weight "Jeffamine ED 900" bismaleimide with 3 parts silica filler was placed in an Entwistle 1½ inch thermoplastic extruder equipped with a PVC screw and extruded onto a 32 mil diameter copper substrate. The copper substrate was coated at a feed rate of 300 feet per minute. The coated wire was passed through a heated tube to cure the precursor. The tube was heated in a range of from 390°–400° F. A residence time of 15 minutes was required. A tough, strippable polymer coating was formed on the wire.

In addition to wire coatings, these precursors exhibit good solvent resistance at elevated temperatures which make them suitable as tank sealants in high performance aircraft. By adjusting the formulation of the precursor, the composition can be tailored to provide products demonstrating good adhesion to a metal substrate, such as aluminum.

We claim:

1. A melt produced, solid branched polyimide precursor having random recurring units of the following structure:

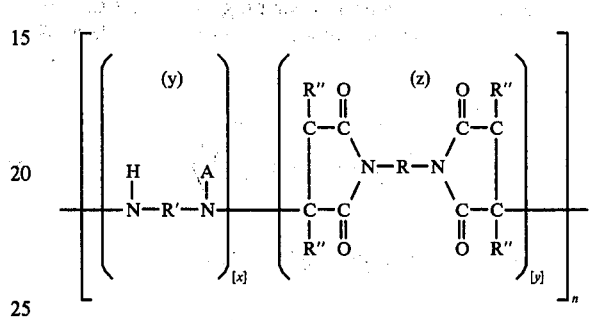

wherein R is a difunctional radical consisting essentially of (i) aliphatic ethers having 1 to 6 carbon atoms in repeating units sufficient to provide a molecular weight of 300 to 10,000 and (ii) aromatic radicals selected from the group consisting of:

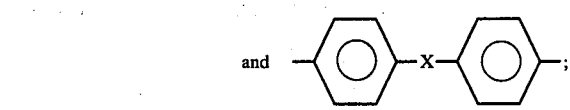

and

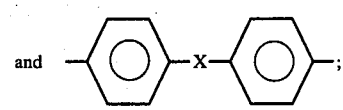

with the component X of said aromatic radical being selected from the group consisting of —O—, —S—, —SO$_2$—, —CH$_2$—, —C$_2$H$_4$, —CO, —C$_3$H$_6$—, and

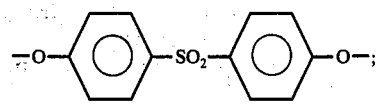

and with the amount of such aliphatic ether ranging from 30 to 60 percent by weight of R present and such aromatic radicals comprising the balance; wherein R' is a difunctional radical consisting essentially of one or more of the aromatic radicals in (ii) above;

R" is selected from the group consisting of —H, —Cl, —CH$_3$, —C$_2$H$_5$, —C$_3$H$_7$, —C$_4$H$_9$, and

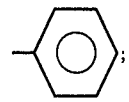

A is selected from the group consisting of hydrogen and

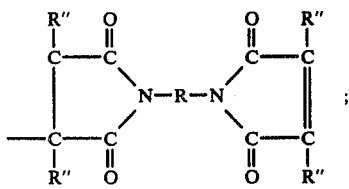

wherein the weight ratio of the y moiety to the z moiety of said precursor ranges from about 1 to 4 to about 1 to 6.5, and wherein n is an integer ranging from 2 to 150.

2. A polyimide precursor according to claim 1 wherein R' is:

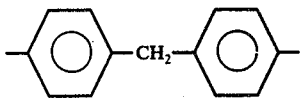

and 70 to 40 percent by weight of R is:

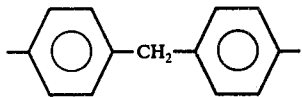

and the balance of R is a difunctional aliphatic ether having the structure:

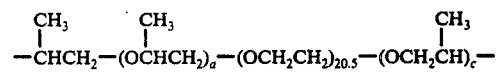

where $a + c$ is 3.5.

3. A polyimide precursor according to claim 1 wherein said aliphatic ether radical R has the structure:

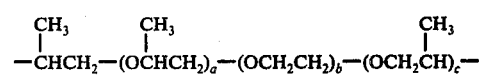

where $a + c$ is 3.5 and $b$ is in a range of from 13.5 to 45.5.

4. A process for the preparation of a precursor of a polyaminobismaleimide comprising:
(A) reacting a polyaliphatic ether diamine with a stoichiometric amount of maleic anhydride to produce a maleimide terminated polyaliphatic ether having the structure:

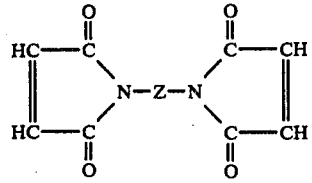

where Z is a polyaliphatic ether containing aliphatic groups having 1 to 6 carbon atoms;
(B) reacting an aromatic diamine with a stoichiometric amount of maleic anhydride to produce an aromatic bismaleimide having the structure:

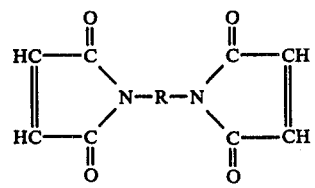

where R is a difunctional benzenoid radical selected from the group consisting of:

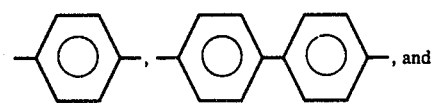

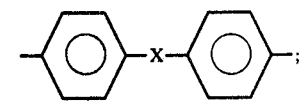

where X is selected from the group consisting of —O—, —S—, —SO$_2$—, —CH$_2$—, —C$_2$H$_4$—, —CO—, —C$_3$H$_6$—, and

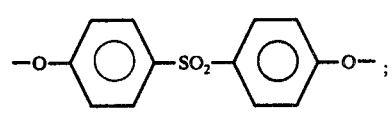

(C) heating an aromatic diamine to produce a melt;
(D) adding said aromatic bismaleimide and said maleimide terminated polyaliphatic ether to said melt to produce a viscous, homogeneous liquid;
(E) heating said liquid for a time of about 15 to 90 minutes at a temperature within the range from about 100° C. to about 150° C.
(F) cooling said liquid to produce a solid precursor; and
(G) curing the polymer resulting from step (F) to produce a crosslinked, intractable material.
5. A process according to claim 4 wherein said maleimide terminated polyaliphatic ether has the structure:

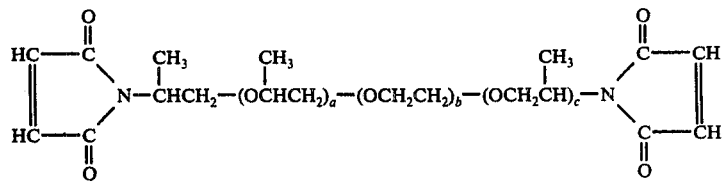

where $a + c$ is 3.5 and $b$ is in a range of 13.5 to 5.5.

6. A process according to claim 4 wherein said aromatic bismaleimide has the structure:
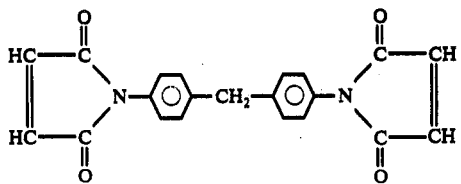
7. A process according to claim 4 wherein said aromatic diamine is methylene dianiline.
* * * * *